United States Patent
Ølmheim et al.

(10) Patent No.: US 10,701,519 B2
(45) Date of Patent: Jun. 30, 2020

(54) TRACKING UNIT FOR A HUMAN-POWERED VEHICLE

(71) Applicant: BikeFinder AS, Stavanger (NO)

(72) Inventors: Ole Martin Ølmheim, Stavanger (NO); Erik Brodahl, Sandnes (NO)

(73) Assignee: BikeFinder AS, Stavanger (NO)

( * ) Notice: Subject to any disclaimer, the term of this patent is extended or adjusted under 35 U.S.C. 154(b) by 0 days.

(21) Appl. No.: 16/064,515

(22) PCT Filed: Dec. 21, 2016

(86) PCT No.: PCT/NO2016/050266
§ 371 (c)(1),
(2) Date: Jun. 21, 2018

(87) PCT Pub. No.: WO2017/111613
PCT Pub. Date: Jun. 29, 2017

(65) Prior Publication Data
US 2018/0359610 A1 Dec. 13, 2018

(30) Foreign Application Priority Data

Dec. 22, 2015 (NO) .................................. 20151779
Dec. 22, 2015 (NO) .................................. 20151781

(51) Int. Cl.
*H04W 4/029* (2018.01)
*B62H 5/20* (2006.01)
(Continued)

(52) U.S. Cl.
CPC .............. *H04W 4/029* (2018.02); *B62H 5/14* (2013.01); *B62H 5/20* (2013.01); *B62J 43/28* (2020.02);
(Continued)

(58) Field of Classification Search
CPC ........ G08G 1/205; G08G 1/162; G08G 1/163; G08G 1/207; H01Q 1/22; H01Q 1/3233;
(Continued)

(56) References Cited

U.S. PATENT DOCUMENTS 5,955,965 A * 9/1999 Calandruccio ........... 340/825.49
6,198,431 B1 * 3/2001 Gibson ..................... G01S 5/02
(Continued)

FOREIGN PATENT DOCUMENTS

| DE | 102005001209 | 7/2005 |
|---|---|---|
| EP | 1103456 A2 | 5/2001 |

(Continued)

OTHER PUBLICATIONS

Norwegian Search Report, Norwegian Patent Application No. 20151779, dated May 31, 2016.
(Continued)

*Primary Examiner* — Meless N Zewdu
(74) *Attorney, Agent, or Firm* — Andrus Intellectual Property Law, LLP

(57) ABSTRACT

A tracking unit is for a human-powered vehicle having a frame and an electric gear shifter. The tracking unit has a tracker, such as a GPS and/or GSM unit, and an antenna for allowing the tracker to communicate. The tracker is adapted to be placed inside the frame of a human-powered vehicle, and includes a wire adapted to extend from the tracker, through a hole in the frame, to the antenna adapted to be mounted on the exterior of or at least partially integrated in the electric gear shifter.

8 Claims, 1 Drawing Sheet

(51) Int. Cl.
*H01Q 1/22* (2006.01)
*H01Q 1/32* (2006.01)
*G08G 1/00* (2006.01)
*H04L 29/08* (2006.01)
*B62K 19/40* (2006.01)
*H04W 4/02* (2018.01)
*B62H 5/14* (2006.01)
*B62J 43/28* (2020.01)
*B62K 3/00* (2006.01)
*H04W 4/021* (2018.01)
*B62K 3/02* (2006.01)
*H04W 12/12* (2009.01)
*H04W 4/40* (2018.01)
*B62J 43/00* (2020.01)
*B62J 45/00* (2020.01)

(52) U.S. Cl.
CPC ............... *B62K 3/00* (2013.01); *B62K 3/02* (2013.01); *B62K 19/40* (2013.01); *G08G 1/205* (2013.01); *H01Q 1/22* (2013.01); *H01Q 1/325* (2013.01); *H01Q 1/3233* (2013.01); *H04L 67/18* (2013.01); *H04W 4/02* (2013.01); *H04W 4/021* (2013.01); *H04W 4/40* (2018.02); *H04W 12/1206* (2019.01); *B62J 43/00* (2020.02); *B62J 45/00* (2020.02)

(58) Field of Classification Search
CPC .................................................... H01Q 1/325;
H01Q 1/32; H01Q 1/30; H01Q 1/27;
H01Q 1/12; H01Q 1/14; H01Q 11/12;
H04W 4/046; H04W 4/40; H04W 4/029;
H04W 8/16; H04W 12/1206; H04W 4/02;
H04W 12/1004; H04W 52/0296; H04W
52/0261; H04W 4/021; H04W 4/025;
H04W 4/027; B62H 5/00; B62H 5/20;
B62H 5/14; B62H 5/12; B62H 5/08;
B62H 5/001; B62H 5/02; B60R 25/30;
B60R 25/33; B60B 7/16; B62K 3/00;
B62K 3/14; B62K 19/40;
H04L 67/18; H04L 67/22; B62J 43/28;
B62J 45/00; B62J 43/00; B62J 6/10;
B62J 9/22
See application file for complete search history.

(56) References Cited

U.S. PATENT DOCUMENTS

| | | | |
|---|---|---|---|
| RE37,443 E * | 11/2001 | Yaguchi | 180/206 |
| 6,623,389 B1 * | 9/2003 | Campagnolo | 474/70 |
| 2005/0012591 A1 | 1/2005 | Tomljenovic et al. | |
| 2010/0267361 A1 * | 10/2010 | Sullivan | 455/404.2 |
| 2013/0150028 A1 * | 6/2013 | Akins et al. | H04W 4/02 |
| 2013/0238238 A1 * | 9/2013 | Hsuan | 701/468 |
| 2016/0264209 A1 * | 9/2016 | DeGray | B62K 19/40 |
| 2017/0000692 A1 * | 1/2017 | Mullen | A61J 7/0076 |

FOREIGN PATENT DOCUMENTS

| | | |
|---|---|---|
| GB | 2492742 | 1/2013 |
| WO | 2010/092356 | 8/2010 |

OTHER PUBLICATIONS

Norwegian Search Report, Norwegian Patent Application No. 20151179, dated Jun. 28, 2016.
Norwegian Search Report, Norwegian Patent Application No. 20151781, dated Jun. 28, 2016.
International Search Report, PCT/NO2016/050266, dated Feb. 13, 2017.
Written Opinion, PCT/NO2016/050266, dated Feb. 13, 2017.
Kickstarter Love: SHY-SPY 1 GPS/GSM Tracker for Bicycles, http://www.bikecommuters.com/2014/02/24/kickstarter-love-shy-spy-gpsgsm-tracker-for, 5 pages, website visited Jun. 19, 2018.
Electronic gear-shifting system. Wikipedia, https://en.wikipedia.org/wiki/Electronic_gear-shifting_system, 7 pages, website visited Jun. 19, 2018.
Extended European Search Report for EP Application No. 16879447.7, dated Jul. 17, 2019.

\* cited by examiner

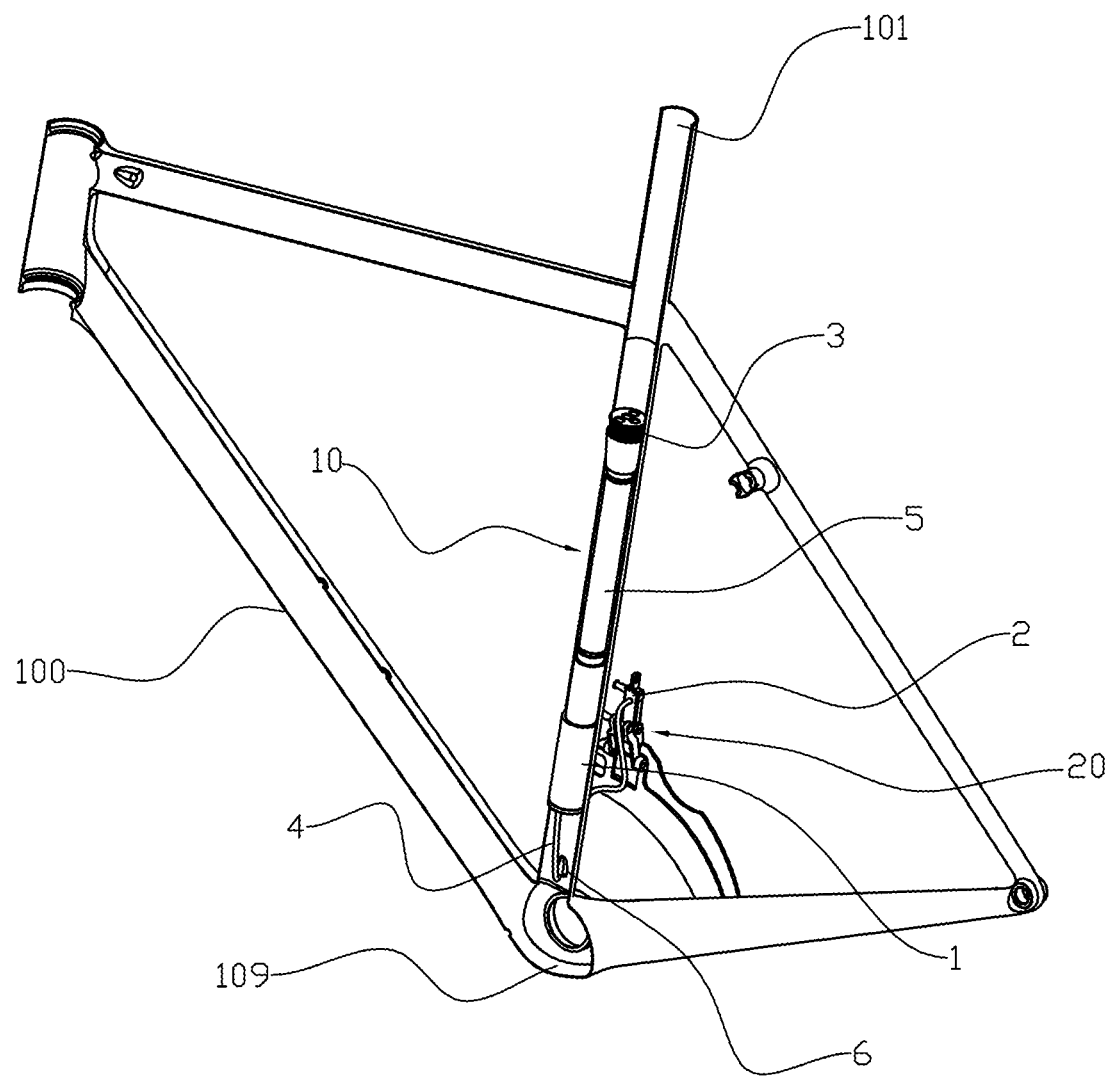

TRACKING UNIT FOR A HUMAN-POWERED VEHICLE

FIELD

The present invention refers to a tracking unit for a human-powered vehicle, the human-powered vehicle comprising a frame and an electric gear shifter. The tracking unit comprises a tracker, such as a GPS unit and/or a GSM unit, and an antenna. The invention also relates to a human-powered vehicle comprising the tracking unit. Said human-powered vehicle may be a bicycle.

BACKGROUND

Theft of human-powered vehicles, such as bicycles, is a large and increasing problem. Expensive bicycles have even been reported to be the aim of organized criminals. One possible counter-measure to the increasing problem is to install tracking units in said vehicles. Said tracking units rely on antennas for communicating with other devices and need a power source.

Tracking units for bicycles that use GPS and/or GSM trackers are known. US2013150028 has addressed the issue of facilitating communication by configuring the water bottle rack to enclose the antenna. This solution has several drawbacks, such as that not all human-powered vehicles are equipped with water bottle racks. In some cases, such as for downhill bikes, having a water bottle rack might not be practical. Owners of human-powered vehicles might also not want a water bottle rack for aesthetic reasons.

Using a battery as a power source for a tracking unit is known. Prior art, such as WO2010092356 A1, includes a dedicated battery as part of a tracking unit.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect, the invention relates to a tracking unit for a human-powered vehicle. The human-powered vehicle comprises a frame and an electric gear shifter. The tracking unit comprises a tracker, such as a GPS unit and/or a GSM unit, and an antenna. Said tracking unit further comprises a wire adapted to extend from the tracker, through a hole in the frame of said human-powered vehicle, to an antenna adapted to be mounted on or at least partly integrated in an electric gear shifter. The tracking unit is adapted to be placed inside the frame of the human-powered vehicle.

The tracking unit according to the first aspect of the present invention aims at offering a better antenna solution for a tracking unit, compared to the prior art. With the antenna for the tracking unit mounted on or integrated in an electric gear shifter it may be challenging for an evil-doer to disable the antenna without damaging the gear shifter. Thus, an evil-doer knowing a vehicle is protected with the invention may be deterred from stealing the vehicle as he may be left with the choice of stealing the vehicle with a disabled antenna and a broken electric gear-shifter, making it less valuable, or stealing the vehicle with the tracking unit according to the invention intact, thus increasing the risk of getting caught. For an evil-doer not aware of the protection, the electric gear shifter may offer good camouflage and an alternative placement for an antenna. It is advantageous for the protection of human-powered vehicles that there are many alternative positions in which antennas may be placed, as that will make it more challenging for an evil-doer to find and disable an antenna.

The tracking unit according to the first aspect of the present invention, when installed in a human-powered vehicle, may be protected from tampering by at least partly protecting parts of the tracking unit that are not enclosed by a frame. This may be done by a layer of protective material, or by using fastening means of protective material. The protective material may be a two-component epoxy material, a polyurethane, a polycarbonate, a nitrogen based thermoset polymer, a ceramic material, a thermoplastic two-component material or a mouldable bulletproof material. Protecting the tracking unit's external parts with protective material protects the tracking unit's ability to communicate from being disabled. By protecting the tracking unit it will become harder and more time-consuming for any evil-doer to disable the tracking unit.

The tracking unit according to the first aspect of the present invention may also comprise a backup battery for providing the tracking unit with power in situations wherein other power sources are disabled, not functioning or not present. A backup energy source will reduce the tracking unit's downtime; time during which the tracking unit is not working as intended. The tracking unit is working as intended if it is consistently monitoring and communicating the human-powered vehicle's position.

The tracking unit according to the first aspect of the present invention may also comprise a motion detection means, such as an accelerometer, a tilt sensor and/or a gyroscope, for detecting movement, wherein the tracking unit is configured for conditional deactivation of the tracking unit when no movement is detected. In an embodiment comprising motion detection means, the term working as intended will refer to a situation where the tracking unit is consistently monitoring and communicating a human-powered vehicle's position unless the tracking unit is temporarily deactivated by the lack of movement registered by the motion detection means. A tracking unit comprising motion detection means is advantageous because deactivation of the tracking unit during standstill will reduce power consumption and thereby increase battery lifetime.

Furthermore, the tracking unit according to the first aspect of the present invention may also comprise an expansion device for securely fastening the tracking unit by expansion internally in a human-powered vehicle frame. Fastening the tracking unit may be advantageous, as it may make it harder to remove the tracking unit for an evil-doer. Furthermore, fastening may be advantageous as it may prevent damage caused to the tracking unit and/or the frame from collisions resulting from movement of the tracking unit relative to the frame during use of the human-powered vehicle.

In a second aspect the invention relates to a human-powered vehicle, the human-powered vehicle comprising the tracking unit according to the first aspect of the invention. The human-powered vehicle further comprises an electric gear-shifter and a battery, wherein said tracker is placed inside the frame of the human-powered vehicle, and wherein said tracking unit includes the wire extending from the tracker, through the hole in the frame, to the antenna that is mounted on the exterior of or at least partially integrated in the electric gear shifter.

In the human-power vehicle in accordance with the second aspect of the invention the antenna may be mounted on the exterior of the electric gear shifter. Mounting the antenna on the exterior may be advantageous in that it may increase the risk of causing damage to the electric gear shifter for any evil-doer attempting to disable the antenna. A damaged gear shifter would mean a less valuable haul for a thief, thus a tracking unit with the antenna mounted on the exterior of the electric gear shifter may be seen as being too In the human-power vehicle in accordance with the second aspect of the invention the antenna may be at least partially integrated in the electric gear shifter. The gear shifter may be an anterior or a posterior gear shifter. Having the antenna at least partially integrated in the electric gear shifter may make it even harder to disable it for an evil-doer without damaging the electric gear shifter.

The antenna of the human-power vehicle in accordance with the second aspect of the invention may preferably be mounted in such a way that it has a minimum angle relative to the ground. An angle is preferred for the antenna to send and/or receive signals of sufficient quality consistently enough for the tracking unit to work as intended.

The human-powered vehicle in accordance with the second aspect of the invention may further comprise a battery coupled to the electric gear shifter for supplying power thereto. In an embodiment the battery may further be coupled to the tracking unit for supplying power thereto. Using an already existing battery solution is advantageous, as it saves cost, weight and space by not requiring a dedicated battery exclusively for the tracking unit to be added.

The human-powered vehicle of the human-power vehicle in accordance with the second aspect may be partly electrically powered, in which case it will comprise an electric motor and a power source for the electric motor. The power source for the electric motor may be the power source for the tracking unit.

In accordance with the second aspect, the human-powered vehicle may be a bicycle.

In a third aspect the invention relates to a tracking unit for a human-powered vehicle, comprising a frame, the human-powered vehicle further comprising an electric gear shifter and a battery for the electric gear shifter, the tracking unit comprising a tracker, such as a GPS and/or GSM unit and an antenna for allowing the tracker to communicate with a receiver. The tracking unit is configured for receiving power from the battery for the electric gear shifter, and the battery is coupled to the tracking unit for supplying power thereto.

The tracking unit according to the third aspect of the present invention aims at offering a better power source solution compared to prior art. Adding a dedicated battery for a tracking unit to a human-powered vehicle has drawbacks in that it adds cost, weight and it takes up space. Using an existing battery is thus advantageous, as it saves cost, weight and space by not requiring a dedicated battery exclusively for the tracking unit to be added.

The tracking unit according to the third aspect, when installed in a human-powered vehicle, may be protected from tampering by at least partly protecting parts of the tracking unit that are not enclosed by a frame. This may be done by a layer of protective material, or by using fastening means of protective material. The protective material may be a two-component epoxy material, a polyurethane, a polycarbonate, a nitrogen based thermoset polymer, a ceramic material, a thermoplastic two-component material or a mouldable bulletproof material. Protecting the tracking unit's external parts with protective material protects the tracking unit's ability to communicate from being disabled. By protecting the tracking unit it will become harder and more time-consuming for a criminal to disable the tracking unit.

The tracking unit in accordance with the third aspect may also comprise a backup battery for providing the tracking unit with power in situations wherein other power sources are disabled, not functioning or not present. A backup energy source will reduce the tracking unit's downtime; time during which the tracking unit is not working as intended. The tracking unit is working as intended if it is consistently monitoring and communicating the human-powered vehicle's position.

The tracking unit in accordance with the third aspect may also comprise a motion detection means, such as an accelerometer, a tilt sensor and/or a gyroscope, for detecting movement, wherein the tracking unit is configured for conditional deactivation of the tracking unit when no movement is detected. In an embodiment comprising motion detection means, the term working as intended will refer to a situation where the tracking unit is consistently monitoring and communicating a human-powered vehicle's position unless the tracking unit is temporarily deactivated by the lack of movement registered by the motion detection means. A tracking unit comprising motion detection means is advantageous because deactivation of the tracking unit during standstill will reduce power consumption and thereby increase battery lifetime.

Furthermore, the tracking unit in accordance with the third aspect may also comprise an expansion device for securely fastening the tracking unit by expansion internally in a human-powered vehicle frame. Fastening the tracking unit may be advantageous, as it may make it harder to remove the tracking unit for an evil-doer. Furthermore, fastening may be advantageous as it may prevent damage caused to the tracking unit and/or the frame from collisions resulting from movement of the tracking unit relative to the frame during use of the human-powered vehicle.

In a fourth aspect the invention relates to a human-powered vehicle comprising the tracking unit is according to third aspect, the human-powered vehicle further comprising an electric gear shifter and a battery, wherein the battery is coupled to the electric gear shifter for supplying power thereto. Furthermore, the battery is coupled to the tracking unit for supplying power thereto.

The term underside refers to the side of the human-powered vehicle facing the ground when the human-powered vehicle is in normal use, internal and internally refers to in a cavity on the inside of the frame of the human-powered vehicle, and external and externally refers to the outside of the frame of the human-powered vehicle.

In the human-powered vehicle in accordance with the fourth aspect of the invention the antenna may be mounted on the underside of the frame of the human-powered vehicle, where it may be mounted using two holes for holding a battery and a junction box. This embodiment requires that the human-powered vehicle comprises two holes as described. Having the antenna mounted on the underside makes it harder to spot for a thief, decreasing the chance of the antenna being disabled. Furthermore, should the antenna be found, it may be more cumbersome and time-consuming for the thief to disable the antenna. Having the antenna not disabled is obviously advantageous, as it allows the tracking unit to communicate wirelessly.

In the human-powered vehicle in accordance with the fourth aspect of the invention the antenna may be placed on the underside of the frame of the human-powered vehicle, where it may be mounted using a drainage hole under a crank. This embodiment requires that the human-powered vehicle comprises a drainage hole under a crank. This embodiment will have the same advantageous effects as those of the previously mentioned embodiment. Furthermore, it may also be advantageous using the drainage hole for mounting the antenna, as it ensures proximity of the antenna to the interior of the frame, minimizing the need for wire extending from the tracker to the antenna on the exterior of the frame.

In the human-powered vehicle in accordance with the fourth aspect of the invention the antenna may be built into a plastic gear wire guide on the underside of the frame of the human-powered vehicle, where the gear wires extends from internally to externally on the frame. In this embodiment, locating the antenna may be extremely hard for a thief, thus severely limiting the risk of the antenna being disabled.

In the human-powered vehicle in accordance with the fourth aspect of the invention the antenna may be placed on the upper side of a lower part of the frame of the human-powered vehicle. By upper side is meant the side facing away from the ground when the human-powered vehicle is in normal use. In this embodiment, mounting holes in the frame for mounting a battery may be used for mounting the antenna. This embodiment requires that the human-powered vehicle comprises such mounting holes, or other means for mounting the antenna to the frame in such a position. This embodiment may make it somewhat easier than in the previously mentioned embodiments to spot the antenna, but may facilitate for better communication conditions for the antenna.

In embodiments comprising an antenna mounted on the underside of the frame of a human-powered vehicle, the antenna is preferably mounted in such a way that it has a minimum angle relative to the ground. An angle is preferred for the antenna to send and/or receive signals of sufficient quality consistently enough for the tracking unit to work as intended.

It is further preferred, for all embodiments in accordance with the fourth aspect of the invention, which comprise an antenna mounted on the exterior of the frame, that the antenna protrudes from the frame to ensure that signals of sufficient quality can be sent from and/or received by the antenna consistently enough for the tracking unit to work as intended.

In a further embodiment in accordance with the fourth aspect of the invention, the antenna may be mounted on the exterior of the electric gear shifter. In a further embodiment, the antenna may be at least partially integrated in the electric gear shifter. The gear shifter may be an anterior or a posterior gear shifter. Having the antenna mounted on or at least partially in an electric gear shifter may make it hard to find the antenna, and it may make it both difficult to disable. Disabling the antenna, when mounted on or at least partially in an electric gear shifter, may cause damage to the electric gear shifter, thus severely reducing the value of the human-powered vehicle. This may make the risk not worth the reward for a thief, thus acting as a deterrent, making this less likely to want to try to steal the vehicle.

In accordance with the fourth aspect, the human-powered vehicle may be a bicycle.

In a fifth aspect, the invention relates to a gear shifter comprising a tracking unit, the tracking unit comprising a tracker, such as a GPS and/or GSM unit, the tracking unit being arranged to receive power from a power supply. The power supply may be a battery. The battery may be a battery for an electrical bike. The gear shifter may be an electrical gear shifter, and the battery may be a battery for the electrical gear shifter. The tracking unit may be at least partly integrated into the gear shifter, or it may be arranged on a surface of the gear shifter. The tracking unit may further comprise an antenna, wherein the antenna may be arranged on the surface of the gear shifter. Having the tracking unit arranged on or at least partly integrated into the gear shifter may be advantageous, as it may be hard to find, hard to disable without damaging the gear shifter and as it offers another alternative location for a tracking unit to be placed. A greater number of possible locations for tracking units on bicycles will make it more time consuming for a thief to locate and disable a tracking unit.

In a sixth aspect, the invention relates to a bicycle comprising the gear shifter according to the fifth aspect of the invention. The bicycle may be any kind of bicycle having a gear shifter.

In a seventh aspect, the invention relates to an electrical bicycle comprising the tracking unit of the first aspect of the invention, wherein the battery for the electrical bicycle is a power source for the tracking unit.

BRIEF DESCRIPTION OF THE DRAWING

In the following is described an example of a preferred embodiment illustrated in the accompanying drawings, wherein:

FIG. 1 shows a bicycle frame provided with an embodiment of the tracking unit in accordance with the invention.

DETAILED DESCRIPTION OF THE DRAWING

In said preferred embodiment, illustrated in FIG. 1, a tracking unit 10 is enclosed inside a bicycle frame 100, with an opening 101 in the top of the frame 100 and a further opening 109 in the bottom of the frame 100. The frame 100 comprises an electric gear shifter 20. The tracking unit 10 comprises a tracker 1 in the form of a GPS unit, an expansion mechanism 3, a battery 5, and a wire 4 extending from the tracker to an antenna 2 mounted on the exterior of the gear shifter 20. Said wire 4 extends from the tracker 1 in the frame 100 to the antenna 2 through a hole 6 in the frame 100.

The parts of the tracking unit 10 provided inside of the frame 100, can be inserted through the opening in the top of the frame 101 and/or inserted through the bottom of the frame 109. The tracker 1 can be positioned above or below the battery 5. By above is meant closer to the top hole 101 in the frame 100, by below is meant closer to the bottom hole 109 in the frame 100.

In the shown embodiment the expansion mechanism 3 is positioned at the top of the tracking unit 10, with the result that no wiring has to pass by the expansion mechanism 3. The tracker 1 is mounted close to or directly below the battery 5, meaning little to no wiring is needed between the tracker 1 and the battery 5 for coupling the tracker 1 to the battery 5. The tracker 1 is furthermore placed close to the hole 6, meaning that wire 4 may be short, and that little work is needed to connect the tracker 1 to the antenna 2.

The battery 5 is a battery for providing power to an electric gear shifter 20, in this embodiment used for powering both the electric gear shifter 20 and the tracking unit 10.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A tracking unit for tracking a human-powered vehicle, the human-powered vehicle comprising a frame and an electric gear shifter, the tracking unit comprising:
   a tracker and an antenna for allowing the tracker to communicate with a receiver, the tracker and receiver being configured for tracking location of the human-powered vehicle, wherein
   said tracker is adapted to be placed inside the frame of the human-powered vehicle; and
   said tracking unit has a wire adapted to extend from the tracker, through a hole in the frame, to the antenna adapted to be mounted on an exterior of the electric gear shifter or at least partially integrated in the electric gear shifter such that an act of disabling the antenna involves a risk of damaging the electric gear shifter.

2. The tracking unit according to claim 1, wherein parts of the tracking unit are not enclosed by the frame are at least partly protected by a tamper protection layer.

3. The tracking unit according to claim 1, further comprising a backup battery for providing power for the tracking unit.

4. A tracking unit for tracking a human-powered vehicle, the human-powered vehicle comprising a frame and an electric gear shifter, the tracking unit comprising:
   a tracker and an antenna for allowing the tracker to communicate with a receiver, the tracker and the receiver being configured for tracking location of the human-powered vehicle, wherein
   said tracker is adapted to be placed inside the frame of the human-powered vehicle; and
   said tracking unit has a wire adapted to extend from the tracker, through a hole in the frame, to the antenna adapted to be mounted on an exterior of the electric gear shifter or at least partially integrated in the electric gear shifter; and
   a motion detector for detecting movement, wherein the tracking unit is configured for conditional deactivation of the tracking unit when no movement is detected.

5. The tracking unit according to claim 1, further comprising an expansion device for securely fastening the tracking unit within a cavity in the human-powered vehicle's frame.

6. A human-powered vehicle comprising:
   a frame, an electric gear shifter, and a battery;
   a tracking unit comprising a tracker located inside the frame;
   wherein said tracking unit has a wire extending from the tracker, through a hole in the frame, to an antenna that is mounted on an exterior of the electric gear shifter or at least partially integrated in the electric gear shifter such that an act of disabling the antenna involves a risk of damaging the electric gear shifter.

7. The human-powered vehicle according to claim 6, wherein the battery is coupled to the tracking unit for supplying power thereto.

8. The human-powered vehicle according to claim 6, wherein the human-powered vehicle is a bicycle.

* * * * *